(12) United States Patent
Nishizawa et al.

(10) Patent No.: US 11,929,687 B2
(45) Date of Patent: Mar. 12, 2024

(54) POWER CONVERTER

(71) Applicant: HITACHI ASTEMO, LTD., Hitachinaka (JP)

(72) Inventors: Youhei Nishizawa, Hitachinaka (JP); Akihiro Goto, Hitachinaka (JP); Yusaku Katsube, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 297 days.

(21) Appl. No.: 17/610,245

(22) PCT Filed: Apr. 21, 2020

(86) PCT No.: PCT/JP2020/017135
§ 371 (c)(1),
(2) Date: Nov. 10, 2021

(87) PCT Pub. No.: WO2020/230541
PCT Pub. Date: Nov. 19, 2020

(65) Prior Publication Data
US 2022/0247327 A1 Aug. 4, 2022

(30) Foreign Application Priority Data
May 13, 2019 (JP) .................................. 2019-090539

(51) Int. Cl.
*H02M 7/53* (2006.01)
*H02M 1/08* (2006.01)
(Continued)

(52) U.S. Cl.
CPC ............. *H02M 7/003* (2013.01); *H02M 1/08* (2013.01); *H02M 7/537* (2013.01); *H02M 7/5387* (2013.01); *H02P 27/06* (2013.01)

(58) Field of Classification Search
CPC ........ H02M 7/003; H02M 7/53; H02M 7/537; H02M 7/5387
See application file for complete search history.

(56) References Cited

U.S. PATENT DOCUMENTS 6,795,324 B2 * 9/2004 Mori ..................... H02M 7/003
257/691
10,811,989 B2 * 10/2020 Suzuki .................. H02M 7/003
(Continued)

FOREIGN PATENT DOCUMENTS

JP 2006-295997 A 10/2006
JP 2008-125240 A 5/2008
(Continued)

OTHER PUBLICATIONS

International Search Report with English translation and Written Opinion issued in corresponding application No. PCT/JP2020/017135 dated Jul. 7, 2020.

*Primary Examiner* — Gary L Laxton
(74) *Attorney, Agent, or Firm* — Foley & Lardner LLP

(57) ABSTRACT

Provided is a power converter that allows a reduction in EMC noise current flowing through a control circuit board. A power converter 1 includes a semiconductor module 52, a capacitor 51, a control circuit board 45a, positive and negative-side bus bars 41, 42 connecting the semiconductor module 52 and the capacitor 51, a base 33 electrically connected to a ground of the control circuit board 45a, the control circuit board 45a being placed on the base 33, and an electrical conductor 35 electrically connected to the base 33 and extending in a stacking direction in which the base 33 and the control circuit board 45a are stacked. The positive and negative-side bus bars 41, 42 extend around the electrical conductor 35 and are connected to the semiconductor module 52.

9 Claims, 8 Drawing Sheets

(51) Int. Cl.
   *H02M 7/00*   (2006.01)
   *H02M 7/537*  (2006.01)
   *H02M 7/5387*     (2007.01)
   *H02P 27/06*      (2006.01)

(56) References Cited

U.S. PATENT DOCUMENTS

| | | | |
|---|---|---|---|
| 10,893,610 B2* | 1/2021 | Hayase | H01L 23/3675 |
| 2008/0112201 A1 | 5/2008 | Yahata et al. | |
| 2010/0188814 A1* | 7/2010 | Nakatsu | B60L 3/003 |
| | | | 361/689 |
| 2015/0029666 A1* | 1/2015 | Kosuga | H02M 7/003 |
| | | | 361/699 |
| 2015/0305188 A1 | 10/2015 | Maeda et al. | |
| 2016/0248333 A1* | 8/2016 | Nakazawa | H05K 7/1432 |
| 2017/0353118 A1* | 12/2017 | Hara | H05K 7/1432 |
| 2020/0028444 A1* | 1/2020 | Tochikawa | H02M 7/003 |

FOREIGN PATENT DOCUMENTS

| | | |
|---|---|---|
| JP | 2010-183748 A | 8/2010 |
| JP | 2014-128084 A | 7/2014 |
| JP | 2017-085800 A | 5/2017 |
| JP | 2018-027000 A | 2/2018 |

* cited by examiner

POWER CONVERTER

TECHNICAL FIELD

The present invention relates to a power converter.

BACKGROUND ART

Vehicles such as a hybrid vehicle, a plug-in hybrid vehicle, and an electric vehicle are equipped with various power converters such as an inverter for driving a motor, a charger for charging a high-voltage battery with power from a commercial power supply, and a DC-to-DC converter for supplying power to an auxiliary battery. A power converter such as an inverter for driving a motor has a structure where a capacitor for smoothing DC power, a semiconductor module including a power conversion circuit unit for converting DC power into AC power, and a bus bar for connecting the capacitor and a power module to a DC power supply are housed in a metal case.

As an example of such a power converter, a structure is known where a control circuit board is disposed above the power module, the capacitor is disposed on a side of the power module, and the capacitor and the power module are connected by a positive-side bus bar and a negative-side bus bar connected to the DC power supply. The positive and negative-side bus bars are integrally formed with resin and are connected to a positive-side terminal and negative-side terminal of the power module, respectively. A connection portion where the positive and negative-side bus bars are connected to the positive and negative-side terminals of the power module is disposed near the control circuit board and directly facing the control circuit board (see, for example, FIG. 2 of PTL 1).

CITATION LIST

Patent Literature

PTL 1: JP 2018-27000 A

SUMMARY OF INVENTION

Technical Problem

As disclosed in PTL 1, a power converter having a structure where a capacitor circuit unit that is a high-voltage circuit unit and a control circuit that is a low-voltage circuit unit are arranged close to each other has a safeguard against a malfunction of the control circuit due to an increase in electromagnetic compatibility (EMC) noise current flowing through a control circuit board, but it is required that the safeguard be further enhanced.

Solution to Problem

A power converter according to one aspect of the present invention includes a semiconductor module including a power conversion circuit unit, a capacitor that smooths DC power and supplies the DC power to the power conversion circuit unit, a control circuit board disposed apart from the capacitor and including a control circuit that controls the power conversion circuit unit, a connection conductor that connects the semiconductor module and the capacitor, a base electrically connected to a ground of the control circuit board, the control circuit board being placed on the base, and an electrical conductor electrically connected to the base and extending in a stacking direction in which the base and the control circuit board are stacked. The connection conductor extends around the electrical conductor and is connected to the semiconductor module.

Advantageous Effects of Invention

According to the present invention, it is possible to reduce stray capacitance between the positive and negative-side bus bars and the control circuit board to reduce an electromagnetic compatibility (EMC) noise current flowing through the control circuit board.

DESCRIPTION OF EMBODIMENTS

Hereinafter, a power converter according to one embodiment of the present invention will be described with reference to the drawings.

Figure 1:
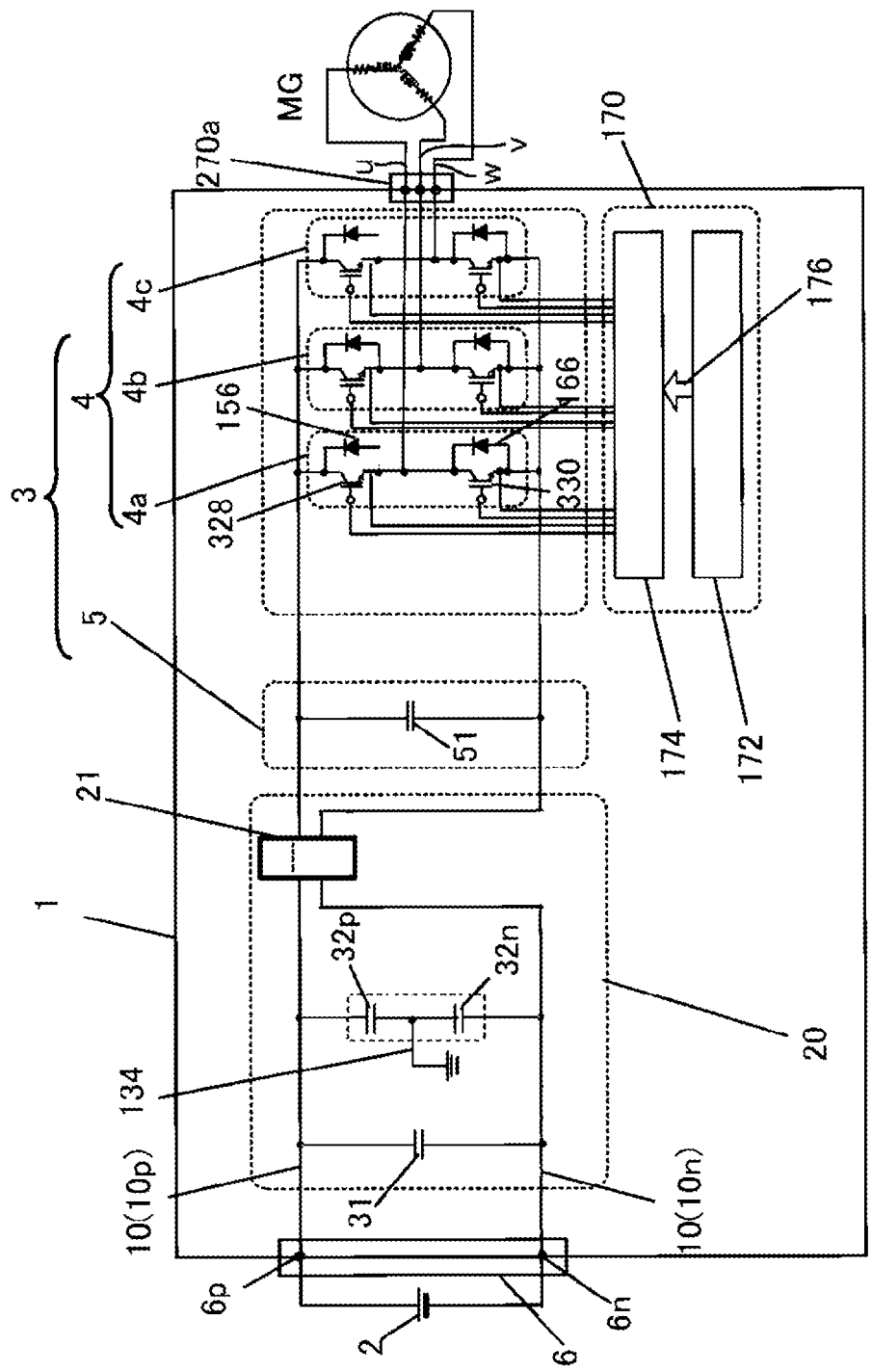
FIG. 1 is a diagram showing an example of a circuit diagram of a power converter according to the present invention.

FIG. 1 is a diagram showing an example of a circuit diagram of the power converter according to the present invention.

A power converter 1 includes an inverter main circuit 3 that converts DC power into AC power, a noise filter circuit unit 20 that reduces electromagnetic noise caused when the inverter main circuit 3 performs the power conversion, and a controller 170. The power converter 1 shown in FIG. 1 has a structure surrounded by a box including the inverter main circuit 3, the noise filter circuit unit 20, and the controller 170.

The inverter main circuit 3 includes a power conversion circuit unit 4 that converts DC power into AC power, and a capacitor circuit unit 5 that smooths the DC power.

The power conversion circuit unit 4 includes three upper and lower arm series circuits 4a, 4b, 4c. Each of the upper and lower arm series circuits 4a, 4b, 4c includes a switching element 328 such as an insulated gate bipolar transistor (IGBT) and a diode 156 serving as an upper arm, and a switching element 330 such as an IGBT and a diode 166 serving as a lower arm. The switching element 328 of the upper arm and the switching element 330 of the lower arm convert DC power into AC power. The diodes 156, 166 are also capable of converting AC power into DC power during regeneration.

The upper and lower arm series circuit 4a is connected to a u phase of a motor generator MG via an AC terminal 270a.

The upper and lower arm series circuit 4b is connected to a v phase of the motor generator MG via the AC terminal 270a. The upper and lower arm series circuit 4c is connected to a w phase of the motor generator MG via the AC terminal 270a.

The motor generator MG outputs a driving force for an HEV or EV based on the AC power supplied from the inverter main circuit 3 via the AC terminal 270a. The motor generator MG also functions as a generator that regenerates AC power when the motor is rotated by an external force and feeds the AC power back into a high-voltage battery 2. The high-voltage battery 2 is a DC power supply of an HEV or EV.

The capacitor circuit unit 5 includes a capacitor 51 and is connected between the high-voltage battery 2 and the power conversion circuit unit 4 to smooth DC power and supply the DC power thus smoothed to the power conversion circuit unit 4.

The noise filter circuit unit 20 is provided between a DC power supply terminal 6 and the capacitor circuit unit 5 and reduces electromagnetic noise caused when the power conversion circuit unit 4 performs the power conversion.

The noise filter circuit unit 20 includes a connection conductor 10, an X capacitor 31, positive and negative-side Y capacitors 32p, 32n, and a core member 21. The connection conductor 10 is a power transmission path that connects the high-voltage battery 2 and the capacitor circuit unit 5. The connection conductor 10 includes a positive-side connection conductor 10p and a negative-side connection conductor 10n. The positive and negative-side connection conductors 10p, 10n are connected to positive and negative-side terminals of the high-voltage battery 2 via a positive-side DC power supply terminal 6p and a negative-side DC power supply terminal 6n, respectively.

The X capacitor 31 is provided between the positive-side connection conductor 10p and the negative-side connection conductor 10n and smooths power higher in frequency than the power to be smoothed by the capacitor circuit unit 5. The positive and negative-side Y capacitors 32p, 32n are provided between the positive-side connection conductor 10p and a ground terminal 134 and between the negative-side connection conductor 10n and the ground terminal 134, respectively, and smooth power.

The core member 21 reduces electromagnetic noise by absorbing fluctuations in current flowing through the connection conductor 10.

A positive-side terminal of the capacitor circuit unit 5 is connected to a collector of the switching element 328 and a cathode of the diode 156 of each upper arm via the positive-side connection conductor 10p. Further, a negative-side terminal of the capacitor 51 is connected to an emitter of the switching element 330 and an anode of the diode 166 of each lower arm via the negative-side connection conductor 10n.

The controller 170 includes two circuits: a driver circuit 174 that drives and controls the power conversion circuit unit 4, and a control circuit 172 that supplies a control signal to the driver circuit 174 over a signal line (bus line) 176. Gate terminals and emitter sense terminals of the IGBTs 328, 330 of each of the upper and lower arm series circuits 4a, 4b, 4c are connected to the controller 170. The upper and lower arm series circuits 4a, 4b, 4c operate in response to a drive signal output from the controller 170 to convert DC power supplied from the high-voltage battery 2 into three-phase AC power. The power obtained as a result of the conversion is supplied to an armature winding of the motor generator MG.

The control circuit 172 includes a microcomputer that computes switching timings of the IGBTs 328, 330. The microcomputer receives, as input information, a target torque value required for the motor generator MG, a current value to be supplied from the upper and lower arm series circuits 4a, 4b, 4c to the armature winding of the motor generator MG, and a magnetic pole position of a rotor of the motor generator MG. The target torque value is based on a command signal output from a host control device (not shown). The current value is detected based on a detection signal output from a current sensor (not shown). The magnetic pole position is detected based on a detection signal output from a rotating magnetic pole sensor (not shown) provided in the motor generator MG.

Figure 2:
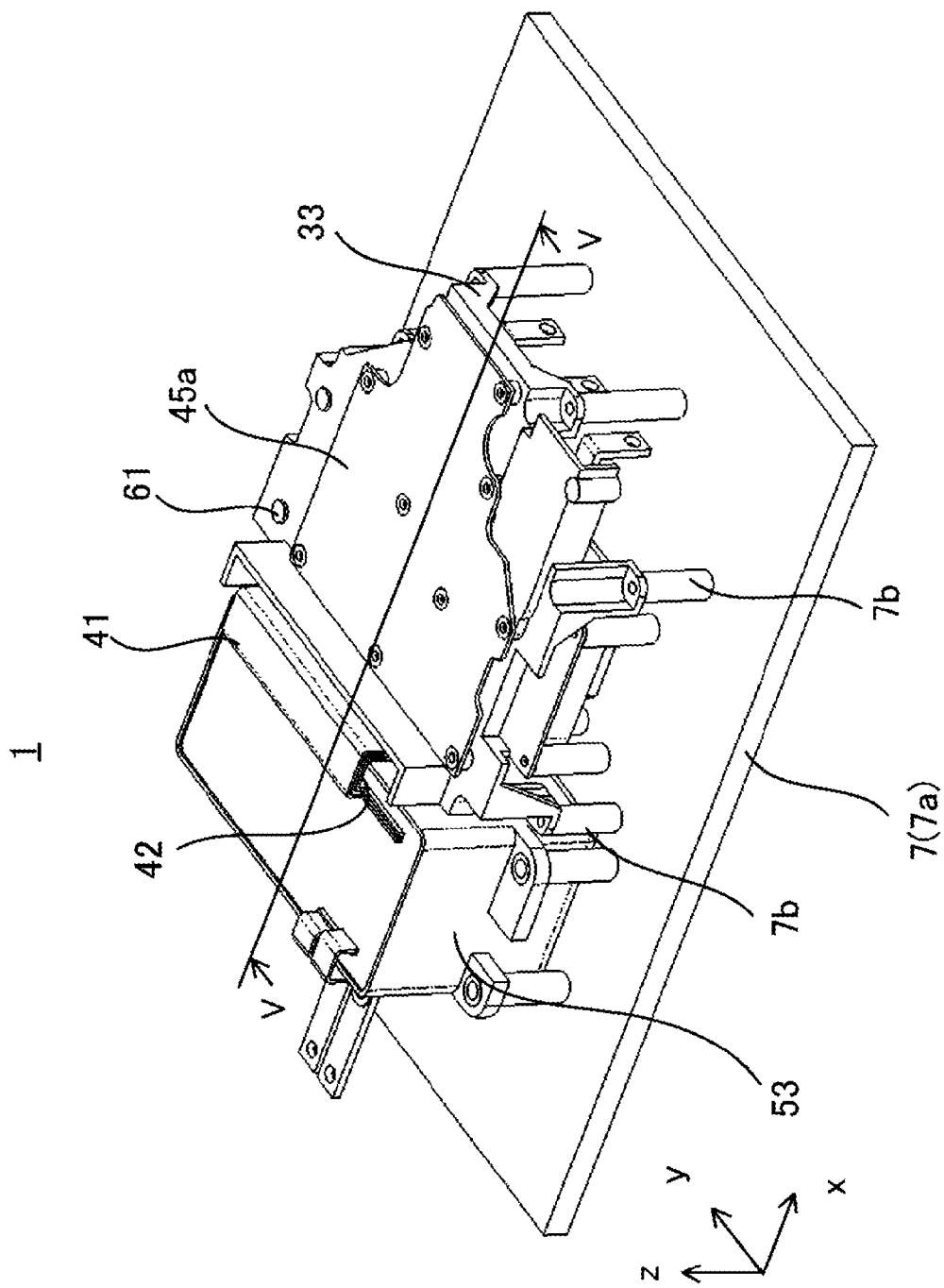
FIG. 2 is an external perspective view of the power converter according to one embodiment of the present invention.

FIG. 2 is an external perspective view of the power converter according to the one embodiment of the present invention.

The power converter 1 includes a housing formed of a case 7 and a cover (not shown).

FIG. 2 shows a state where the cover is removed from the case 7. Of the case 7, side walls that define a housing portion are not shown, and only a bottom 7a of the housing portion is shown.

In the following description, the x direction, the y direction, and the z direction are as shown in the drawings.

The case 7 is made of metal such as an aluminum alloy.

A capacitor housing portion 53 is provided approximately at a center of the case 7 in a width direction (y direction), and a base 33 is disposed on one side of the case 7 (right side in the drawing) in a length direction (x direction) and apart from the capacitor housing portion 53. Although details will be described later, a plurality of capacitor elements 51a (see FIG. 4) constituting the capacitor 51 are housed in the capacitor housing portion 53. A control circuit board 45a is disposed on the base 33 and is fastened to the base 33 with a fastening member 61 such as a screw.

Figure 3:
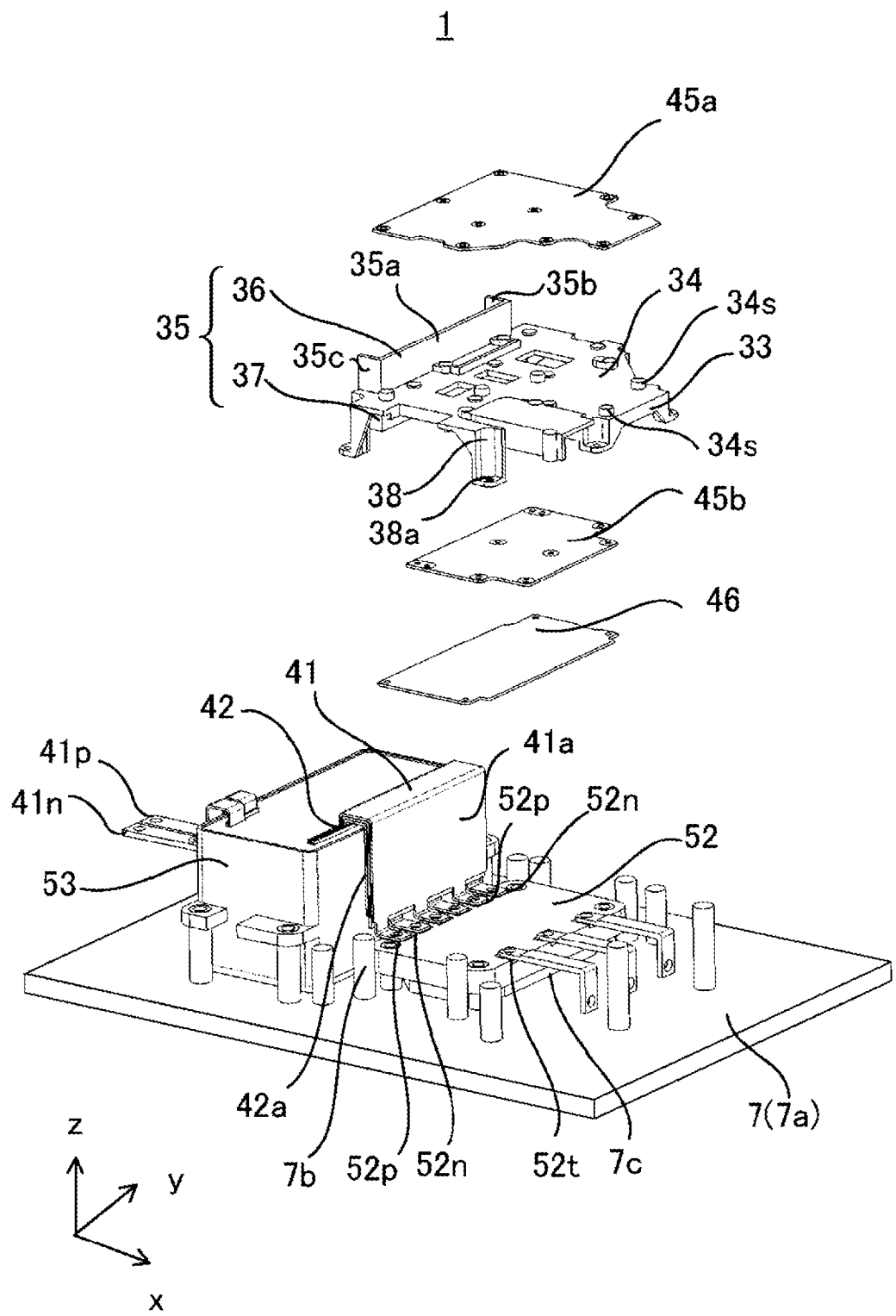
FIG. 3 is an exploded perspective view of the power converter shown in FIG. 2.
Figure 4:
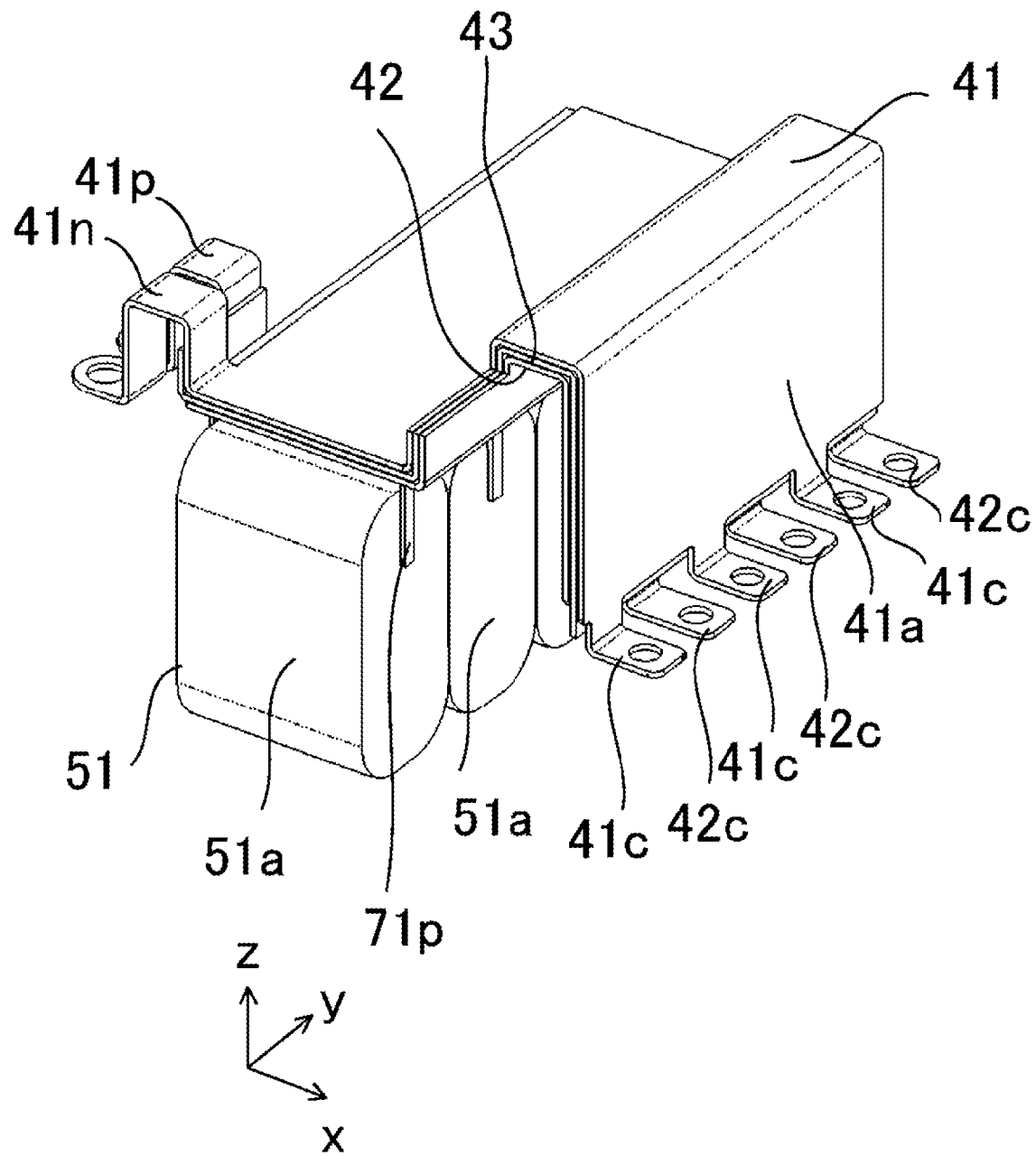
FIG. 4 is a perspective view of a connection structure of the power converter shown in FIG. 2 where a capacitor and a connection conductor are connected.
Figure 5:
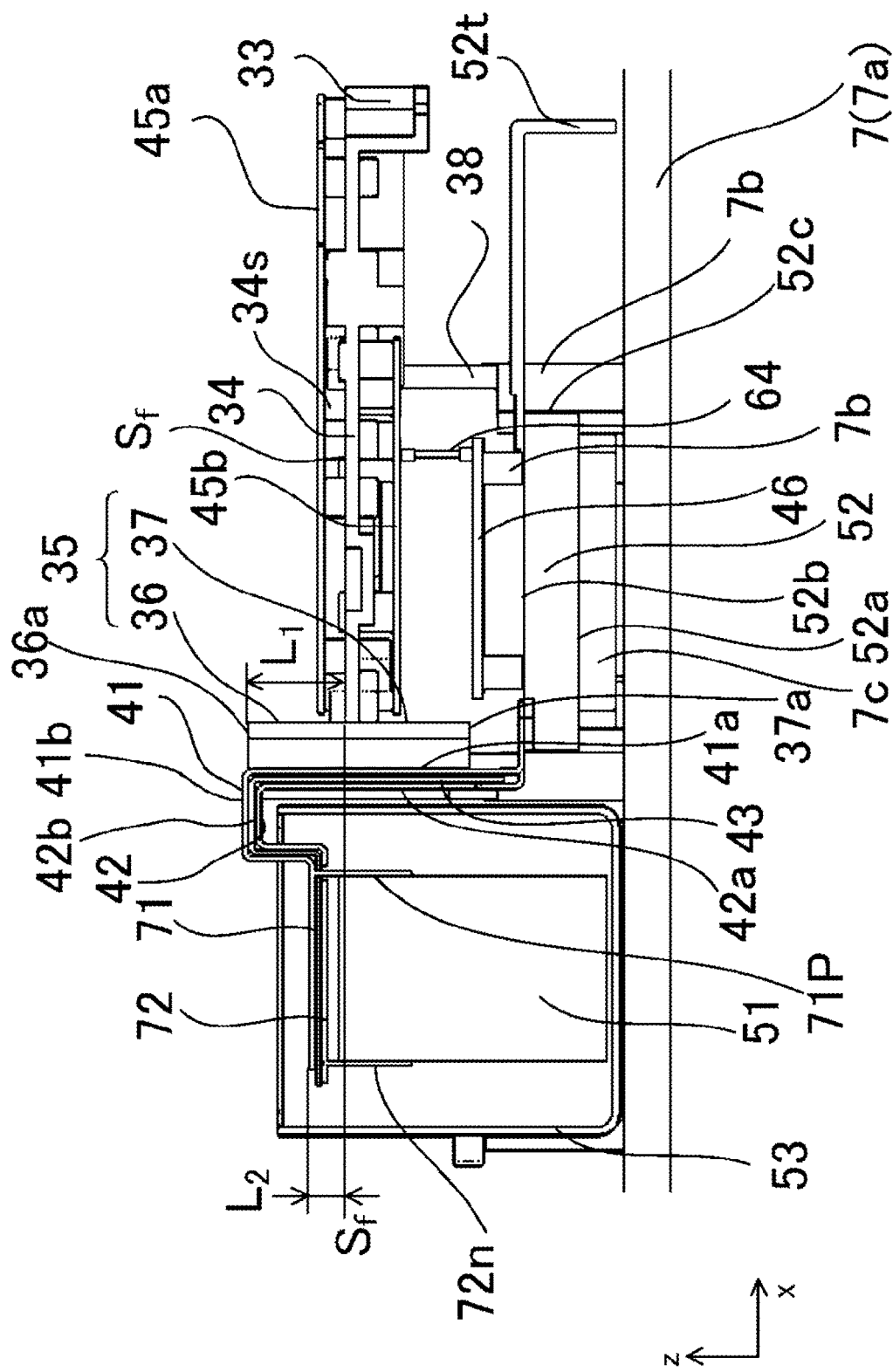
FIG. 5 is a cross-sectional view, taken along a line V-V, of the power converter shown in FIG. 2.

FIG. 3 is an exploded perspective view of the power converter shown in FIG. 2, and FIG. 4 is a perspective view of a connection structure of the power converter shown in FIG. 2 where the capacitor and the connection conductor are connected. FIG. 5 is a cross-sectional view, taken along a line V-V, of the power converter shown in FIG. 2.

The base 33 is made of a conductive metal such as an aluminum alloy, iron, or copper. The base 33 includes a support 34 having an approximately flat shape, an electrical conductor 35 extending in a direction (z direction) approximately orthogonal to an xy plane of the support 34, and a plurality of mounting leas 38 extending from the support 34 toward the bottom 7a of the case 7.

The control circuit board 45a is placed on the support 34 of the base 33, and a control circuit board 45b is placed beneath the support 34 of the base 33. That is, the support 34 of the base 33 is sandwiched between the control circuit board 45a and the control circuit board 45b as viewed from above. The control circuit board 45a and the control circuit board 45b include the control circuit 172 shown in FIG. 1.

As shown in FIG. 5, the electrical conductor 35 extends in a stacking direction (z direction) in which the support 34 of the base 33 and the control circuit boards 45a, 45b are stacked. As shown in FIG. 3, the electrical conductor 35 includes a wide portion 35a extending longer in the y direction along one side of the support 34, and a pair of sides 35b, 35c provided at both ends of the wide portion 35a and extending in the −x direction (toward the capacitor 51), that is, approximately at a right angle to the wide portion 35a. The electrical conductor 35 includes a first electrical conductor 36 extending upward (+z direction) from the support 34 and a second electrical conductor 37 extending downward (−z direction) from the support 34. The pair of sides 35b, 35c is provided on both the first electrical conductor 36 and the second electrical conductor 37.

Each mounting leg 38 (see FIG. 3) has a mounting hole 38a provided at a distal end of the mounting leg 38. A fastening member (not shown) such as a screw or a bolt is inserted into the mounting hole 38a of the mounting leg 38 to fasten the base 33 to a boss 7b provided on the case 7 as shown in FIG. 2.

A semiconductor module 52 is disposed under the support 34 of the base 33 and is fastened to a fastening portion 7c provided on the bottom 7a of the case 7. The semiconductor module 52 includes the upper and lower arm series circuits 4a, 4b, 4c shown in FIG. 1. As shown in FIG. 3, the semiconductor module 52 includes a positive DC terminal 52p, a negative DC terminal 52n, and an AC terminal 52t of each of the upper and lower arm series circuits 4a, 4b, 4c. A drive circuit board 46 is disposed between the support 34 of the base 33 and the semiconductor module 52. The drive circuit board 46 includes the driver circuit 174 shown in FIG. 1.

As shown in FIGS. 3 and 5, a positive-side bus bar 41 and a negative-side bus bar 42 connect the capacitor 51 and the semiconductor module 52 (see FIG. 3). The positive-side bus bar 41 and the negative-side bus bar 42 correspond to the positive-side connection conductor 10p and the negative-side connection conductor 10n shown in FIG. 1, respectively. The capacitor 51 and the base 33 constitute an EMC noise reduction structure to be described below.

The positive-side bus bar 41 is connected to the positive-side DC power supply terminal 6p (see FIG. 1) of the DC power supply terminal 6 via a positive terminal 41p located at one end of the positive-side bus bar 41, connected to a positive terminal (not shown) of the capacitor 51 via a connection portion 71 (see FIG. 5), and connected to each positive DC terminal 52p (see FIG. 3) of the semiconductor module 52 via a connection end 41c (see FIG. 4) located at the other end of the positive-side bus bar 41. The negative-side bus bar 42 is connected to the negative-side DC power supply terminal 6n (see FIG. 1) of the DC power supply terminal 6 via a negative terminal 41n located at one end of the negative-side bus bar 42, connected to a negative terminal (not shown) of the capacitor 51 via a connection portion 72 (see FIG. 5), connected to the negative terminal (not shown) of the capacitor 51 via the connection portion 72 (see FIG. 5), and connected to each negative DC terminal 52n (see FIG. 3) of the semiconductor module 52 via a connection end 42c (see FIG. 4) located at the other end of the negative-side bus bar 42. AC power obtained by the upper and lower arm series circuits 4a, 4b, 4c is output from the AC terminal 52t of the semiconductor module 52.

As shown in FIG. 5, the positive and negative-side bus bars 41, 42 are disposed apart from the electrical conductor 35 of the base 33 in the length direction (x direction). As shown in FIG. 2, the length in the width direction (y direction) of the positive and negative-side bus bars 41, 42 is slightly shorter than the length between the pair of sides 35b, 35c of the electrical conductor 35, and the positive and negative-side bus bars 41, 42 are each disposed apart from both the sides 35b, 35c of the electrical conductor 35. Resin 43 (see FIG. 5) is interposed between the positive-side bus bar 41 and the negative-side bus bar 42 so as to insulate the positive-side bus bar 41 from the negative-side bus bar 42. The positive-side bus bar 41 and the negative-side bus bar 42 may be formed together with the resin 43 into a molded bus bar body by insert molding.

The positive and negative-side bus bars 41, 42 have falling portions 41a, 42a, respectively. The falling portions 41a, 42a extend downward (−z direction) along the electrical conductor 35 from a side near an upper end 36a of the first electrical conductor 36 approximately in parallel to the electrical conductor 35. The positive and negative-side bus bars 41, 42 are fastened to the positive and negative DC terminals 52p, 52n of the semiconductor module 52 with fastening members (not shown) such as screws or bolts below a lower end 37a of the second electrical conductor 37.

As shown in FIG. 4, the capacitor 51 includes the plurality of capacitor elements 51a. The plurality of capacitor elements 51a are electrically connected in parallel by positive and negative-side terminals 71p, 72n of the positive and negative-side connection portions 71, 72 of the positive and negative-side bus bars 41, 42.

Note that, according to the present embodiment, a structure where the positive-side bus bar 41 is disposed over (+z direction) the negative-side bus bar 42 has been given as an example. Alternatively, a structure where the negative-side bus bar 42 is disposed over (+z direction) the positive-side bus bar 41 may be employed.

As shown in FIG. 5, the upper end 36a of the first electrical conductor 36 of the electrical conductor 35 extends upward (+z direction) higher than the connection portions 71, 72 where the positive and negative-side bus bars 41, 42 are connected to the capacitor 51.

As described above, the control circuit board 45a is mounted on (+z direction) the support 34 of the base 33. The control circuit board 45b is mounted beneath (−z direction) the support 34 of the base 33. The control circuit board 45a is disposed below (−z direction) the upper end 36a of the first electrical conductor 36 of the electrical conductor 35, in other words, adjacent to the support 34. The control circuit board 45b is disposed above (+z direction) the lower end 37a of the second electrical conductor 37 of the electrical conductor 35, in other words, adjacent to the support 34.

The semiconductor module 52 includes a metal case high in thermal conductivity, such as an aluminum alloy. Referring to FIG. 5, the metal case of the semiconductor module 52 includes a pair of wide surfaces 52a, 52b having a rectangular shape, and two pairs of peripheral side surfaces 52c that are narrow in width and are provided between peripheries of the wide surfaces 52a, 52b. That is, the peripheral side surfaces 52c include four rectangular side surfaces. One wide surface 52a of the metal case of the semiconductor module 52 is coupled to the fastening portion 7c provided on the bottom 7a of the case 7 in a thermal-conductive manner, that is, thermally coupled to the fastening portion 7c. Although not shown, a cooling channel through which a refrigerant such as coolant flows is provided in the case 7, and the semiconductor module 52 is cooled via the fastening portion 7c of the case 7. Cooling fins may be provided on the wide surface 52a of the semiconductor module 52.

As shown in FIG. 5, the capacitor 51 is disposed on the left side (−x direction) of the electrical conductor 35 extending in the vertical direction (z direction). The control circuit boards 45a, 45b placed on the support 34 of the base 33 are disposed on the right side (+direction) of the electrical conductor 35. The semiconductor module 52 is disposed in a space provided between the support 34 of the base 33 and the bottom 7a of the case 7. The semiconductor module 52 is disposed with the wide surface 52a in contact with the bottom 7a of the case 7 via the fastening portion 7c. The wide surface 52a of the metal case of the semiconductor module 52 has a large area in order to make heat dissipation better, so that, when the wide surface 52a is disposed perpendicular to the bottom 7a of the case 7, the profile of the power converter 1 becomes higher. According to the present embodiment, the wide surface 52a of the semiconductor module 52 is disposed parallel to the bottom 7a of the case 7. As described above, the structure where the semiconductor module 52 is disposed between the support 34 of the base 33 and the bottom 7a of the case 7 allows a reduction in profile and size of the power converter 1.

The drive circuit board 46 is disposed over the other wide surface 52b of the semiconductor module 52. The drive circuit board 46 includes the driver circuit 174 shown in FIG. 1. The drive circuit board 46 is fastened to an upper end of the boss 7b (see FIG. 5) provided on case 7. The drive circuit board 46 is connected to the control circuit board 45b by a connector 64 (see FIG. 5). The connector 64 corresponds to the bus line 176 shown in FIG. 1.

The positive and negative-side bus bars 41, 42 extend downward along the electrical conductor 35 from upper flat portions 41b, 42b approximately in parallel to the electrical conductor 35 and are connected to the semiconductor module 52 slightly below the lower end 37a of the second electrical conductor 37, in other words, by extending around the electrical conductor 35.

As shown in FIG. 5, the support 34 of the base 33 includes a board support surface (board installation surface) $S_f$ on which a support member 34s that supports the control circuit board 45a is provided. The semiconductor module 52 is disposed in a space on one side of the board support surface $S_f$ that coincides with the board support surface $S_f$ as viewed from above, and the connection portions 71, 72 where the capacitor 51 is connected to the positive and negative-side bus bars 41, 42 are disposed on a side opposite from the one side on which the semiconductor module 52 is disposed and above an extension line of the board support surface $S_f$. That is, the connection portions 71, 72 are higher in position in the z direction than the board support surface $S_f$.

A distance L1 from the board support surface $S_f$ to the upper end 36a of the first electrical conductor 36 is larger than a distance L2 from the board support surface $S_f$ to the connection portions 71, 72 of the positive and negative-side bus bars 41, 42. That is, the first electrical conductor 36 is provided extending upward (+z direction) higher than the connection portions 71, 72 of the positive and negative-side bus bars 41, 42. This increase a facing area between the positive and negative-side bus bars 41, 42 and the electrical conductor 35.

Figure 6:
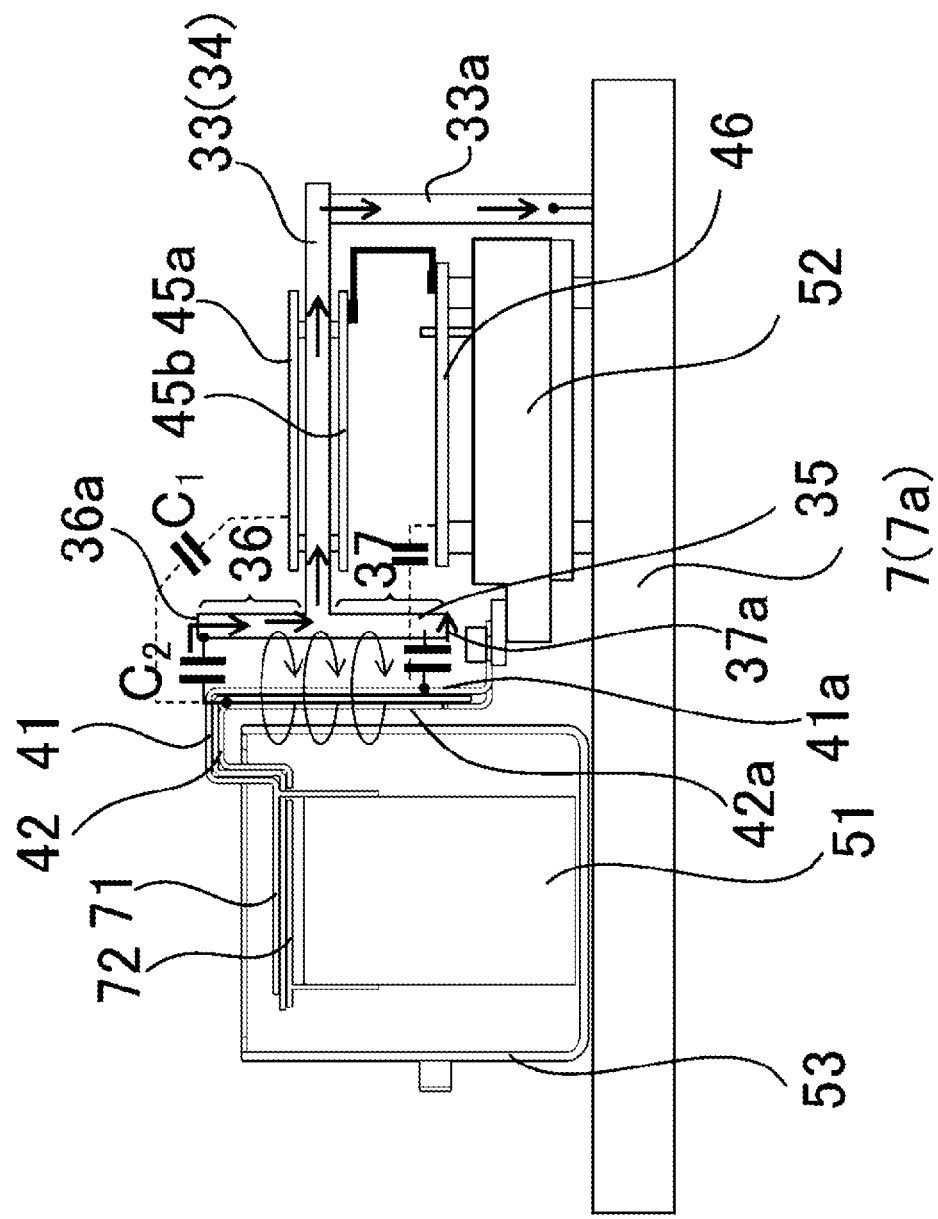
FIG. 6 is a schematic diagram showing a flow of EMC noise current in the power converter shown in FIG. 5.

FIG. 6 is a schematic diagram showing a flow of EMC noise current in the power converter shown in FIG. 5.

As shown in FIG. 6, the base 33 includes the support 34 provided with the support member 34s that supports the control circuit board 45a. The base 33 is provided with the electrical conductor 35 extending in the vertical direction (z direction) from the support 34. The capacitor 51 is disposed on the left side (−x direction) of the electrical conductor 35, and the control circuit board 45a is disposed on the right side (+x direction) of the electrical conductor 35. The falling portions 41a, 42a of the positive and negative-side bus bars 41, 42 are disposed on the left side (−x direction) of the electrical conductor 35. That is, the positive and negative-side bus bars 41, 42 and the control circuit board 45a are separated by the electrical conductor 35.

EMC noise is caused due to magnetic/capacitive coupling between the positive and negative-side bus bars 41, 42 and the control circuit board 45a. The EMC noise is caused mainly due to capacitive coupling.

According to the present embodiment, provided between the positive and negative-side bus bars 41, 42 and the control circuit board 45a is the electrical conductor 35 extending in a direction orthogonal to the xy plane, in other words, in the vertical direction in which the base 33 and the control circuit board 45a are stacked. Such a component arrangement causes capacitive coupling due to stray capacitance $C_1$ between the positive and negative-side bus bars 41, 42 and the control circuit board 45a and stray capacitance $C_2$ between the positive and negative-side bus bars 41, 42 and the electrical conductor 35.

As shown by arrows in FIG. 6, due to capacitive coupling caused by the stray capacitance $C_1$ between the positive and negative-side bus bars 41, 42 and the control circuit board 45a, the EMC noise current flows from the positive and negative-side bus bars 41, 42 to the ground through the control circuit board 45a, the support 34 of the base 33, and the case 7. Further, due to capacitive coupling caused by the stray capacitance $C_2$ between the positive and negative-side bus bars 41, 42 and the electrical conductor 35, the EMC noise current flows from the positive and negative-side bus bars 41, 42 to the ground through the electrical conductor 35 and the support 34 of the base 33, and the case 7. As described above, the electrical conductor 35 extends in the vertical direction in which the capacitor 51 and the control circuit board 45a are stacked, and the falling portions 41a, 42a of the positive and negative-side bus bars 41, 42 extend along the electrical conductor 35 from a side near the upper end 36a of the electrical conductor 35 to a side near the lower end 37a of the electrical conductor 35 approximately in parallel to the electrical conductor 35. This makes the facing area between the positive and negative-side bus bars 41, 42 and the electrical conductor 35 larger, so that the stray capacitance $C_2$ between the positive and negative-side bus bars 41, 42 and the electrical conductor 35 becomes larger.

In FIG. 6, the EMC noise current is shown as a diagram flowing from a side 33a of the base 33 remote from the electrical conductor 35 to the case 7. As shown in FIG. 3, the base 33, however, includes the plurality of mounting legs 38, and each mounting leg 38 is fastened to the boss 7b provided on case 7 with a fastening member (not shown). That is, the base 33 is fastened to the case 7 near the electrical conductor 35. This makes impedance of the path through which the EMC noise current flows lower and thus makes the EMC noise current shunted to the electrical conductor 35 larger, so that the EMC noise reduction effect can be further increased.

Figure 7:
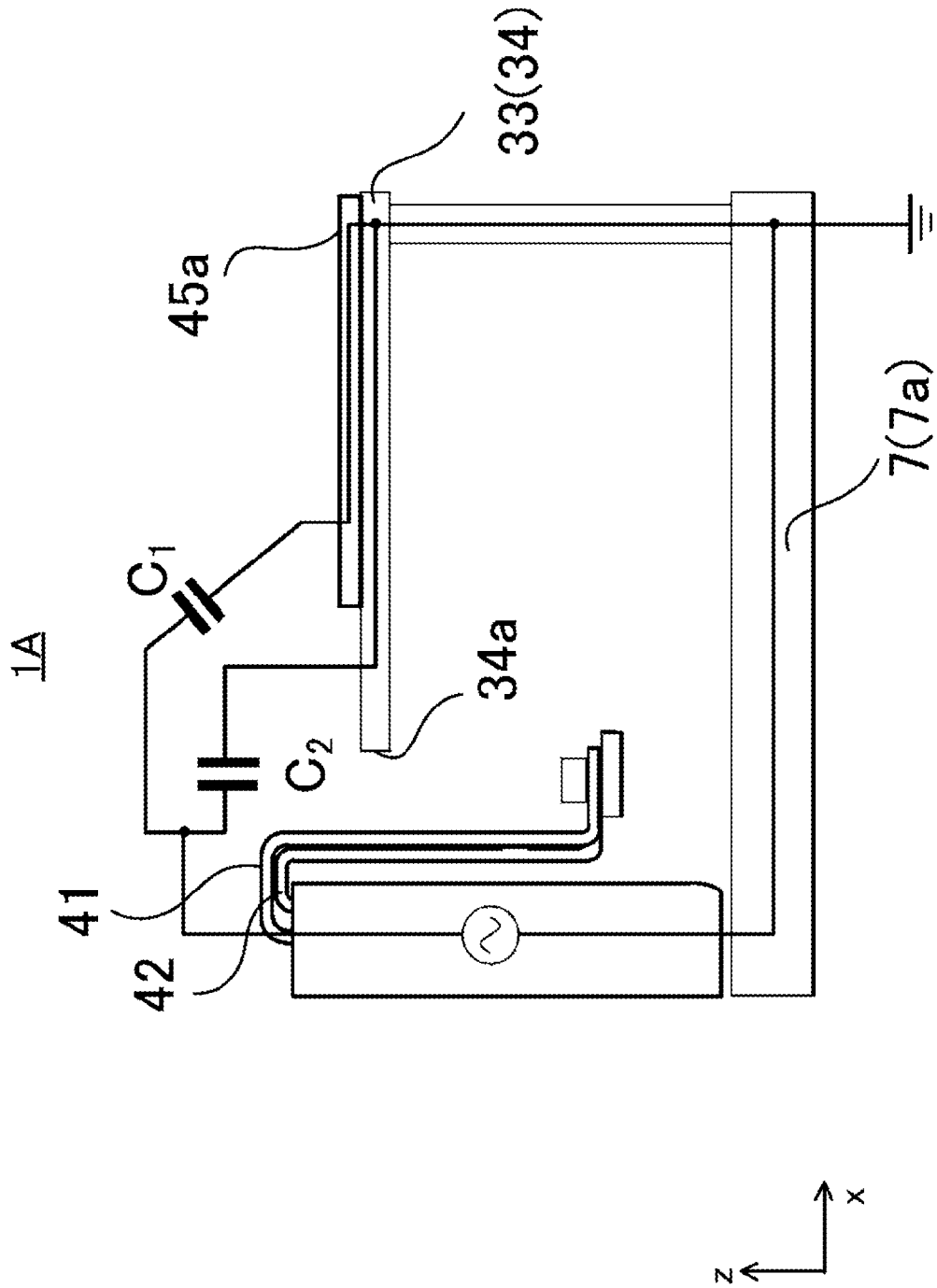
FIG. 7 is a diagram showing a flow of EMC noise current in a power converter according to a comparative example.
Figure 8:
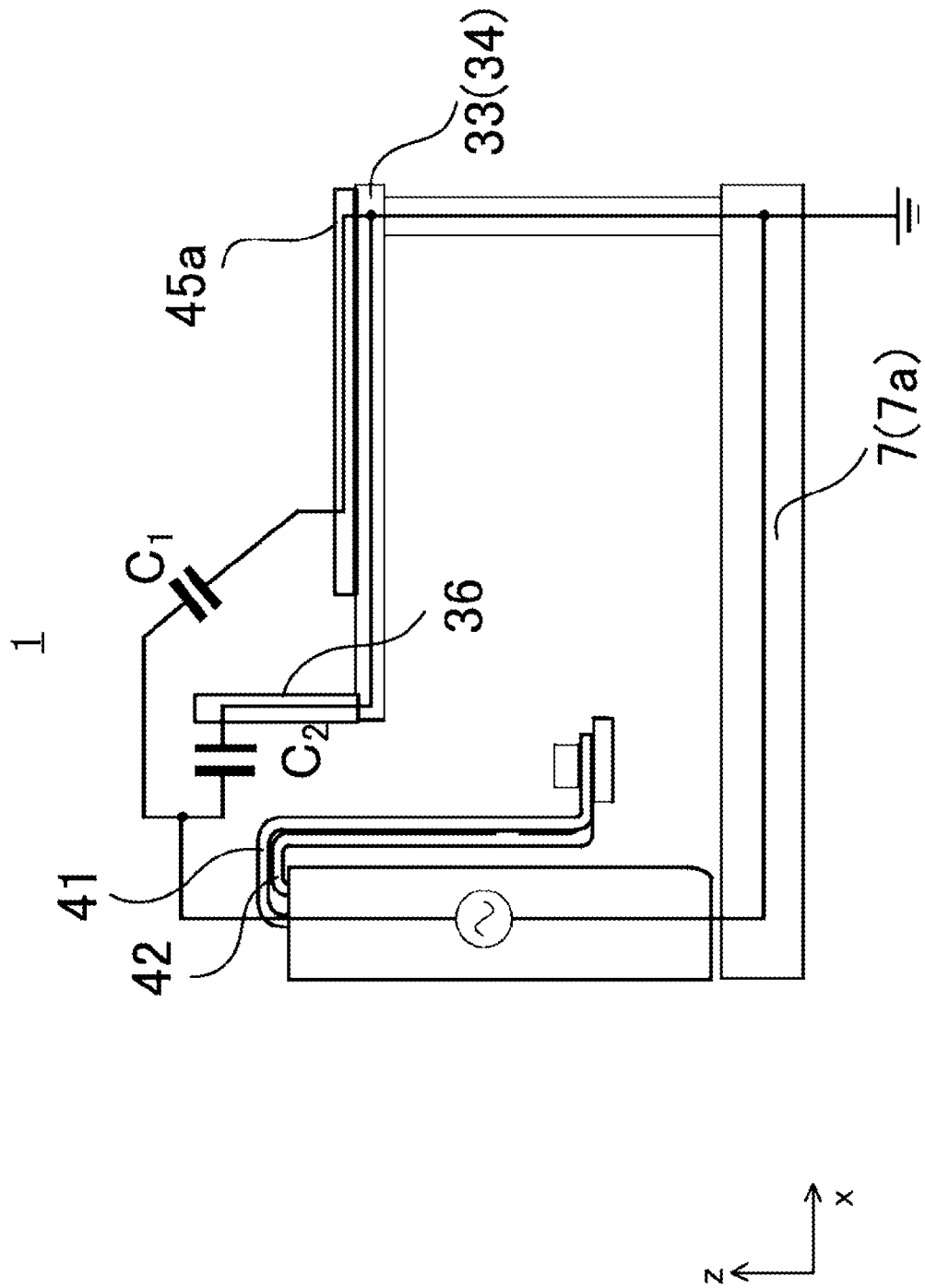
FIG. 8 is a diagram showing the flow of EMC noise current in the power converter shown in FIG. 5.

FIG. 7 is a schematic diagram showing a flow of EMC noise current in a power converter 1A according to a comparative example, and FIG. 8 is a schematic diagram showing a flow of EMC noise current in the power converter 1 shown in FIG. 5.

In the power converter 1A according to the comparative example shown in FIG. 7, the base 33 includes no electrical conductor 35. That is, in the power converter 1A according to the comparative example, the electrical conductor 35 extending in the vertical direction (z direction) is not provided between the support 34 of the base 33 and the positive and negative-side bus bars 41, 42, and the positive and negative-side bus bars 41, 42 are arranged directly facing an end 34a of the support 34 of the base 33 and the control circuit board 45a.

In this structure, as shown in FIG. 7, stray capacitance $C_1$ between the positive and negative-side bus bars 41, 42 and the control circuit board 45a and stray capacitance $C_2$ between the positive and negative-side bus bars 41, 42 and the base 33 are connected in parallel. Such a structure causes the EMC noise current flowing from a noise source to be shunted to the stray capacitances $C_1$, $C_2$ arranged in parallel at a ratio between the stray capacitances $C_1$, $C_2$.

In the structure according to the comparative example, the stray capacitance $C_1$ and the stray capacitance $C_2$ are approximately equal to each other.

That is, $C_1 \approx C_2$.

Therefore, EMC noise currents $I_1$, $I_2$ flowing through the stray capacitances $C_1$, $C_2$ satisfy $I_1 \approx I_2$.

On the other hand, in the EMC noise reduction structure according to the present embodiment shown in FIG. 8, the first electrical conductor 36 extending in the vertical direction is provided between the support 34 of the base 33 and the positive and negative-side bus bars 41, 42. The positive and negative-side bus bars 41, 42 extend in the vertical direction along the first electrical conductor 36. The control circuit board 45a is disposed remote from the positive and negative-side bus bars 41, 42 as compared with the first electrical conductor 36.

Accordingly, a relationship between the stray capacitance $C_1$ and the stray capacitance $C_2$ satisfies $C_2 \gg C_1$.

Therefore, the EMC noise currents $I_1$, $I_2$ flowing through the stray capacitances $C_1$, $C_2$ satisfy $I_2 \gg I_1$.

That is, most of the EMC noise current from the positive and negative-side bus bars 41, 42, which are noise sources, is shunted to the electrical conductor 35 rather than the control circuit board 45a. Therefore, the EMC noise current flowing from the positive and negative-side bus bars 41, 42 to the control circuit board 45a can be greatly reduced.

As described above, the distance L1 from the board support surface $S_f$ to the upper end 36a of the first electrical conductor 36 is larger than the distance L2 from the extension line of the board support surface $S_f$ to the connection portions 71, 72 of the positive and negative-side bus bars 41, 42. This makes the facing area between the positive and negative-side bus bars 41, 42 and the first electrical conductor 36 larger, so that the stray capacitance $C_2$ between the positive and negative-side bus bars 41, 42 and the base 33 becomes larger.

As shown in FIG. 5, the second electrical conductor 37 is provided between the positive and negative-side bus bars 41, 42 and the control circuit board 45b. The control circuit board 45b is disposed above (+z direction) the lower end 37a of the second electrical conductor 37 in the vertical direction. This makes stray capacitance between the positive and negative-side bus bars 41, 42 and the control circuit board 45b smaller than the stray capacitance $C_2$ between the positive and negative-side bus bars 41, 42 and the electrical conductor 35.

This makes the EMC noise current flowing from the positive and negative-side bus bars 41, 42 to the control circuit board 45b smaller than the positive and negative-side bus bars 41, 42 flowing from the positive and negative-side bus bars 41, 42 to the base 33.

Further, the electrical conductor 35 includes the second electrical conductor 37 extending toward the drive circuit board 46 including a drive circuit that drives the semiconductor module 52. This makes the stray capacitance C between the positive and negative-side bus bars 41, 42 and the second electrical conductor 37 larger than the stray capacitance between the positive and negative-side bus bars 41, 42 and the drive circuit board 46, so that the EMC noise current flowing through the drive circuit board 46 is reduced.

Note that, in the above description, the electrical conductor 35 structured to extend in the direction orthogonal to the xy plane has been given as an example. Alternatively, the electrical conductor 35 may have a structure inclined relative to the xy plane. When the electrical conductor 35 has a structure inclined relative to the xy plane, the positive and negative-side bus bars 41, 42 preferably extend parallel to the electrical conductor 35 in order to increase the stray capacitance between the positive and negative-side bus bars 41, 42 and the electrical conductor 35.

According to the above-described embodiment, the following effects are obtained.

(1) A power converter 1 includes a semiconductor module 52 including a power conversion circuit unit 4, a capacitor 51 that smooths DC power and supplies the DC power to the power conversion circuit unit, a control circuit board 45a disposed apart from the capacitor 51 and including a control circuit that controls the power conversion circuit unit 4, positive and negative-side bus bars (connection conductors) 41, 42 that connect the semiconductor module 52 and the capacitor 51, a base 33 electrically connected to a ground of the control circuit board 45a, the control circuit board 45a being placed on the base 33, and an electrical conductor 35 electrically connected to the base 33 and extending in a stacking direction in which the base 33 and the control circuit board 45a are stacked. The positive and negative-side bus bars 41, 42 extend around the electrical conductor 35 and are connected to the semiconductor module. This can make stray capacitance $C_1$ between the positive and negative-side bus bars 41, 42 and the control circuit board 45 smaller than stray capacitance $C_2$ between the positive and negative-side bus bars 41, 42 and the electrical conductor 35, so that the EMC noise current flowing through the control circuit board 45a can be reduced.

(2) The electrical conductor 35 and the base 33 are formed into a single body. This allows efficient production of the electrical conductor 35 and the base 33 by casting or the like.

(3) The electrical conductor 35 extends approximately parallel to the stacking direction in which the base 33 and the control circuit board 45a are stacked. This allows an increase in facing area between the electrical conductor 35 and the positive and negative-side bus bars 41, 42 to make stray capacitance between the electrical conductor 35 and the positive and negative-side bus bars 41, 42 larger, so that the EMC noise current flowing through the control circuit board 45a can be reduced.

(4) The base 33 includes a support 34 on which the control circuit board 45a is placed, the control circuit board 45a is disposed on one side of the support 34 in the stacking direction, and the semiconductor module 52 is disposed on the other side of the support 34 in the stacking direction. This structure avoids the side of the support 34 opposite from the control circuit board 45a from becoming empty and has the semiconductor module 52 disposed on the side, so that the profile and size of the power converter 1 can be reduced.

(5) The base 33 has a board support surface $S_f$ that supports the control circuit board 45a, the semiconductor module 52 is disposed on one side of the board support surface $S_f$ in the stacking direction in which the base 33 and the control circuit board 45a are stacked, and the connection portions 71, 72 where the capacitor 51 is connected to the positive and negative-side bus bars 41, 42 are disposed on the other side of the board support surface $S_f$ and above an extension line of the board support surface $S_f$. This makes the stray capacitance $C_1$ between the positive and negative-side bus bars 41, 42 and the control circuit board 45a smaller, so that the EMC noise current flowing through the control circuit board 45a is reduced more effectively.

(6) The base 33 has the board support surface $S_f$ that supports the control circuit board 45a, and a distance L1 from the board support surface $S_f$ of the base 33 to an upper end 36a of the base 33 is larger than a distance L2 from the extension line of the board support surface $S_f$ to the connection portions 71, 72 where the positive and negative-side bus bars 41, 42 are connected to the capacitor 51. This allows an increase in facing area between the positive and negative-side bus bars 41, 42 and the electrical conductor 35 to make the stray capacitance $C_2$ between the positive and negative-side bus bars 41, 42 and the electrical conductor 35 larger, so that the EMC noise current flowing through the control circuit board 45a is reduced more effectively.

(7) The control circuit board 45a includes the control circuit board 45a disposed on one surface side of the base 33 and a control circuit board 45b disposed on a surface side opposite from the one surface side, the base 33 includes the support 34 that supports the control circuit board 45a and the control circuit board 45b, and the electrical conductor 35 includes a first electrical conductor 36 extending from the support 34 toward the control circuit board 45a and a second electrical conductor 37 extending from the support 34 toward the control circuit board 45b. This makes stray capacitance C between the positive and negative-side bus bars 41, 42 and each of the first electrical conductor 36 and the second electrical conductor 37 larger than stray capacitance between the positive and negative-side bus bars 41, 42 and the control circuit boards 45a, 45b, so that the EMC noise current flowing through the control circuit boards 45a, 45b is reduced.

(8) Further provided is a drive circuit board 46 including a drive circuit that drives the semiconductor module 52, and the electrical conductor 35 include the second electrical conductor 37 extending toward the drive circuit board 46. This makes the stray capacitance C between the positive and negative-side bus bars 41, 42 and the electrical conductor 35 larger than the stray capacitance between the positive and negative-side bus bars 41, 42 and the drive circuit board 46, so that the EMC noise current flowing through the drive circuit board 46 is reduced.

(9) Further provided is a case 7 having a bottom (one surface) 7a approximately parallel to the control circuit board 45a, the semiconductor module 52 has a pair of wide surfaces 52a, 52b and a narrow peripheral side surface 52c surrounding a periphery of the wide surface 52a, and one wide surface 52a of the semiconductor module 52 and the bottom 7a of the case 7 approximately parallel to the control circuit board 45a are thermally coupled. The wide surface 52a large in area of the semiconductor module 52 is disposed approximately parallel to the bottom 7a of the control circuit board 45a to be thermally coupled with the bottom 7a, so that it is possible to reduce the profile of the power converter 1 as compared with a structure where the semiconductor module 52 is disposed in a direction orthogonal to the control circuit board 45a and thus to obtain the power converter 1 having a low profile and capable of cooling the semiconductor module 52.

Note that, in the above-described embodiment, a structure where the control circuit boards 45a, 45b are provided on the upper and lower surfaces of the base 33, respectively, has been given as an example. Alternatively, the control circuit board 45a (45b) may be provided only on the upper surface or lower surface of the base 33.

In the above-described embodiment, the base 33 having a structure where the first electrical conductor 36 extends upward (+z direction) from the support 34, and the second electrical conductor 37 extends downward (−z direction) from the support 34 has been given as an example. Alternatively, when a structure where the control circuit boards 45a, 45b are arranged only on one surface of the support 34 is employed, the base 33 may have a structure where the electrical conductor 35 (36) extends only toward the side where the control circuit boards 45a, 45b are arranged.

In the above-described embodiment, the base 33 in which the first electrical conductor 36 and the second electrical conductor 37 are formed into a single body by casting or the like has been given as an example. Alternatively, the first electrical conductor 36 and/or the second electrical conductor 37 may be formed as a member separate from the base 33 and fastened to the base 33.

Alternatively, the electrical conductor 35 may be formed integrally with the case 7. As an example, the electrical conductor may be connected to a side wall (not shown) provided in the case 7.

In the above-described embodiment, a structure where one of the pair of wide surfaces 52a, 52b of the semiconductor module 52 is thermally coupled to the bottom 7a of the case 7 and cooled has been given as an example. Alternatively, a structure where a cooling channel through which coolant flows is provided in the case 7 to cool both the pair of wide surfaces 52a, 52b of the semiconductor module 52 may be employed.

Although various embodiments and modifications have been described above, the present invention is not limited to these contents. Other aspects conceivable within the scope of the technical idea of the present invention also fall within the scope of the present invention.

REFERENCE SIGNS LIST 1 power converter
4 power conversion circuit unit
7 case
7a bottom
10 connection conductor
33 base
34 support
35 electrical conductor
35a, 35b wide portion
36 first electrical conductor
36a upper end
37 second electrical conductor
37a lower end
41 positive-side bus bar (connection conductor)
42 negative-side bus bar (connection conductor)
45a, 45b control circuit board
46 drive circuit board
51 capacitor
52 semiconductor module
52a, 52b wide surface
71, 72 connection portion
72 connection portion
170 controller
172 control circuit
$S_f$ board support surface
L1, L2 distance

The invention claimed is:

1. A power converter comprising:
a semiconductor module including a power conversion circuit unit;
a capacitor that smooths DC power and supplies the DC power to the power conversion circuit unit;
a control circuit board disposed apart from the capacitor and including a control circuit that controls the power conversion circuit unit;
a connection conductor that connects the semiconductor module and the capacitor;

a base electrically connected to a ground of the control circuit board, the control circuit board being placed on the base; and an electrical conductor electrically connected to the base and extending in a stacking direction in which the base and the control circuit board are stacked, wherein the connection conductor extends around the electrical conductor and is connected to the semiconductor module.

2. The power converter according to claim 1, wherein the electrical conductor and the base are formed into a single body.

3. The power converter according to claim 1, wherein the electrical conductor extends approximately parallel to the stacking direction in which the base and the control circuit board are stacked.

4. The power converter according to claim 1, wherein the base includes a support on which the control circuit board is placed, the control circuit board is disposed on one side of the support in the stacking direction, and the semiconductor module is disposed on another side of the support in the stacking direction.

5. The power converter according to claim 1, wherein
the base has a board support surface that supports the control circuit board, and
the semiconductor module is disposed on one side of the board support surface in the stacking direction in which the base and the control circuit board are stacked, and
a connection portion where the capacitor is connected to the connection conductor is disposed on another side of the board support surface and above an extension line of the board support surface.

6. The power converter according to claim 1, wherein the base has a board support surface that supports the control circuit board, and a distance from the board support surface of the base to an upper end of the base is larger than a distance from an extension line of the board support surface to a connection portion where positive and negative-side bus bars are connected to the capacitor.

7. The power converter according to claim 1, wherein
the control circuit board includes a first control circuit board disposed on one surface side of the base and a second control circuit board disposed on a surface side opposite from the one surface side, and
the base includes a support that supports both the first control circuit board and the second control circuit board, and
the electrical conductor includes a first electrical conductor extending from the support toward the first control circuit board, and a second electrical conductor extending from the support toward the second control circuit board.

8. The power converter according to claim 1, further comprising a drive circuit board including a drive circuit that drives the semiconductor module,
wherein the electrical conductor includes a second electrical conductor extending toward the drive circuit board.

9. The power converter according to claim 1, further comprising a case having a surface approximately parallel to the control circuit board,
wherein the semiconductor module has a pair of wide surfaces and a narrow peripheral side surface surrounding peripheries of the wide surfaces, and
one of the wide surfaces of the semiconductor module and the surface of the case are thermally coupled.

* * * * *